United States Patent
Toccaceli et al.

[11] Patent Number: 6,117,235
[45] Date of Patent: Sep. 12, 2000

[54] CONTINUOUS COATING AND BREADING APPARATUS

[75] Inventors: Robert Toccaceli, Sandusky; Richard Hummel, Huron, both of Ohio

[73] Assignee: Stein, Inc., Sandusky, Ohio

[21] Appl. No.: 09/008,914

[22] Filed: Jan. 20, 1998

[51] Int. Cl.[7] ................................................ B05C 19/04
[52] U.S. Cl. ........................... 118/118; 118/24; 118/103; 118/308
[58] Field of Search .................................. 118/18, 22, 23, 118/24, 103, 308; 99/450.1, 494; 426/289, 295

[56] References Cited

U.S. PATENT DOCUMENTS

| | | |
|---|---|---|
| 2,092,836 | 9/1937 | Engels et al. |
| 2,119,910 | 6/1938 | Ferry . |
| 2,300,396 | 11/1942 | Bookidis . |
| 2,347,164 | 4/1944 | Petrili . |
| 2,878,776 | 3/1959 | Vogel . |
| 3,647,189 | 3/1972 | Johnson . |
| 3,738,313 | 6/1973 | Heim ........................................... 118/24 |
| 3,759,218 | 9/1973 | Korstredt .................................... 118/24 |
| 3,860,105 | 1/1975 | Johnson . |
| 3,885,519 | 5/1975 | Orlowski . |
| 4,078,517 | 3/1978 | Castellano et al. ........................ 118/18 |
| 5,238,493 | 8/1993 | Miller . |

FOREIGN PATENT DOCUMENTS

| | | |
|---|---|---|
| 228744 | 12/1910 | Germany . |
| 3228614 | 2/1984 | Germany . |

*Primary Examiner*—Laura Edwards
*Attorney, Agent, or Firm*—Oldham & Oldham Co., L.P.A.

[57] ABSTRACT

A machine and method for coating food or other product with a coating material may include a product conveyor belt and at least one roller assembly positioned to cooperate with the conveyor and accept product discharged therefrom. The roller assembly may include a roller and plate which are positioned adjacent one another and define a space therebetween. Products introduced to the roller assembly are pressed between the roller and plate to press the coating material into the product, thereby maximizing percentage pick up of the coating on the product. Additionally, the outer surface of the roller is configured to produce surface characteristics or textures in the coating material which are desired. Different surface characteristics or textures can be created by varying the outer surface configuration or by rotating the roller at a different speed relative to the plate. A series of roller assemblies is preferably used in cooperation with one another to allow flexibility in the types of surface configurations and textures achievable, as well as in the types of products which can be coated. The rollers of the series of cooperating roller assemblies may also form a space therebetween through which products are passed and pressed between respective rollers. Each roller in the cooperating series of roller assemblies may be independently driven at different rotational speeds if desired. The machine and methods achieve excellent coating characteristics and appearance, and can produce unique "homestyle" coating appearances and textures in a continuous coating operation.

20 Claims, 4 Drawing Sheets

CONTINUOUS COATING AND BREADING APPARATUS

BACKGROUND OF THE INVENTION

This invention generally relates to coating machines and methods for selectively dispensing a breading or other coating material onto food products, to thoroughly and adequately coat the food products. More particularly, the invention is directed to a coating machine and process of coating food products with a material, wherein the machine enables a coating material to be more effectively dispensed onto and set-up on the food product by positioning the food product in at least one coating chamber in which the food product is tumbled to allow uniform application of coating material.

In the field of large scale production of prepared foods, a large variety of various food products are machine coated with batter and breading or the like before being fried or cooked and packaged for purchase by a consumer. The coating materials used to coat such food products may be breading comprising dry farinaceous materials which may take many forms, but will normally include grain flour in some form. The breading material may also include seasonings, spices, shortening, etc., to form a coating which adds flavor and texture to the product. Other coating material such as ground cereal, dried vegetables or the like may be used as desired. Most breading materials may be roughly classified by their appearance into one of three classes, including flour breading, free flowing breading, or Japanese-style crumbs. Each of these various breading materials have their own peculiarities which may affect the design of a machine adapted to apply the breading material to food pieces. As an example, flour breading, which consists of finely ground dust-like particles, may have a tendency to pack under pressure, thereby increasing the chance that flow of the breading material within a coating machine will become inhibited due to congestion or packing of the breading material. Additionally, with a flour breading, a problem may exist with adequately distributing the breading material within the breading machine to achieve the desired coating characteristics uniformly for all food products introduced into the machine.

Similarly, the breading classified as free flowing usually comprise reasonably hard and roughly spherical particles ranging in size from dust to about $3/32$ on an inch in diameter and may be crackermeal or the like. A problem may exist with adequately distributing free flowing breading material within the coating machine while preventing leakage of the breading material from the coating machine. The Japanese style crumbs consist of a modified wheat flour with small percentages of yeast, salt, sugar, vegetable oil and other additives. The Japanese style crumbs appear to be dried shredded white bread having particle sizes as large as ½ inch or as little as flour size particles with a distribution of sizes therebetween. The Japanese-style crumbs contain no uniform shape and are very delicate such that the coating machine must be able to properly handle this type of breading material to avoid degradation of the quality and particle sizes thereof.

Regardless of the specific breading selected, it is a primary concern to produce a breaded or coated food product which has an aesthetically pleasing appearance and texture. It is also an ultimate aim in the food processing industry to perform the breading operation as a continuous process, so that it may be a part of the overall continuous process of preparing the foodstuff. This is in spite of the fact that a batch-type of breading operation will generally result in a more aesthetically and gustatorially pleasing product. The batch-type of operation most commonly used would be a hollow drum or roller device, which would be charged with breading and the food products to be coated. The device would then be closed and rotated, so that the food products would be tumbled in the breading in a manner that is not unlike that which would be encountered in a manual breading operation, in which pieces of the food product would be individually handled. After a sufficient contacting time, the rotation would be stopped, the device opened and the contents removed, inspected if necessary, and passed on to further processing. A desirable appearance and texture, termed a "homestyle" coating, can be produced by drum type breading operations. Although producing a desired coating appearance and texture, particular problems encountered in a large scale tumbler unit are the size of the device and the number of pieces of the food product handled in a batch. As the size of the device becomes larger, the time required for loading and unloading becomes increasingly large, and this time is essentially dead time in terms of operation. Further, loading limitations are introduced because when a large number of pieces of food product are introduced into the device in a charge, the tumbling of the pieces against the other pieces may be detrimental to the breading process.

Other breading operations have been made continuous in the past. In such operations, the food products are typically placed on a conveyor belt and passed under a falling curtain of breading material. In many instances, such a falling curtain of breading cannot properly coat the entire food product in a single pass, and the pieces of food product must be turned or flipped, and breading reapplied to ensure an appropriate amount of breading coverage on the product. In some product configurations, a simple flipping of the product will not result in a proper coating. In addition, this type of breading operation simply can't achieve the "homestyle" coating appearance which is desired. Although deficient in these respects, the attractiveness of a continuous operation has resulted in commercial acceptance of these conveyor-belt based schemes to obtain high production rates and provide a cost effective breading operation.

An ideal breading operation would treat the food products as either individual pieces or as small groups of a few pieces, and would tumble these pieces in a sufficient amount of breading or coating material. The tumble time would be sufficient to entirely coat the pieces of food product, and the process would optimally be continuous. The supply of food products to be coated would be continuous, preferably introduced on a conveyor belt, and would discharge the coated product on a similar continuous basis, also preferably on a conveyor belt. In short, an ideal breading operation does not sacrifice the quality of coating for the sake of production speed, but instead provides a quality product in a timely and cost effective fashion.

SUMMARY OF THE INVENTION

Based upon the foregoing, there has been found a need to provide a coating machine which can adequately handle various types of breading materials, and which can obtain uniform and desired coating characteristics are achieved in a continuous operation. It is therefore a main object of the invention to provide a coating machine and method which will more effectively coat food products while avoiding disadvantages found in the prior art.

It is another object of the invention to provide a coating machine which will insure that a coating material is applied to and firmly set up on food products introduced into the coating machine, to avoid degradation of coating characteristics either within the coating machine or subsequent to the coating operation.

Yet another object of the invention is to provide a coating machine and method of coating which will provide desirable features such as uniform coating of large volumes of food products, to provide thicker coatings of breading materials on the food product as well as to provide the coated food product with a desired texture, such as a "homestyle" texture.

These and other objects of the invention are achieved by a cost effective, simple and sanitary breading machine suitable for coating a variety of food products, such as poultry, with different types of breading materials. After coating of upper and lower surfaces of food products introduced into the breading machine, a significant dwell time within the breading machine is achieved in the construction to allow breading material to more effectively set up on the coated food products. The coating machine further includes structure to enable the food products to be introduced to at least one roller assembly which presses the product between a roller and a plate to impart surface characteristics and texture as desired. The invention allows a food processor to effectively and efficiently coat large volumes of products in a continuous process without sacrificing desirable characteristics which yield a high quality and more appealing product.

BRIEF DESCRIPTION OF THE DRAWINGS

Additional objects and advantages of the apparatus and process of the present invention will become apparent to one skilled in the art upon reference to the following detailed description in association with the accompanying drawings, wherein.

DETAILED DESCRIPTION OF THE INVENTION

Figure 1:
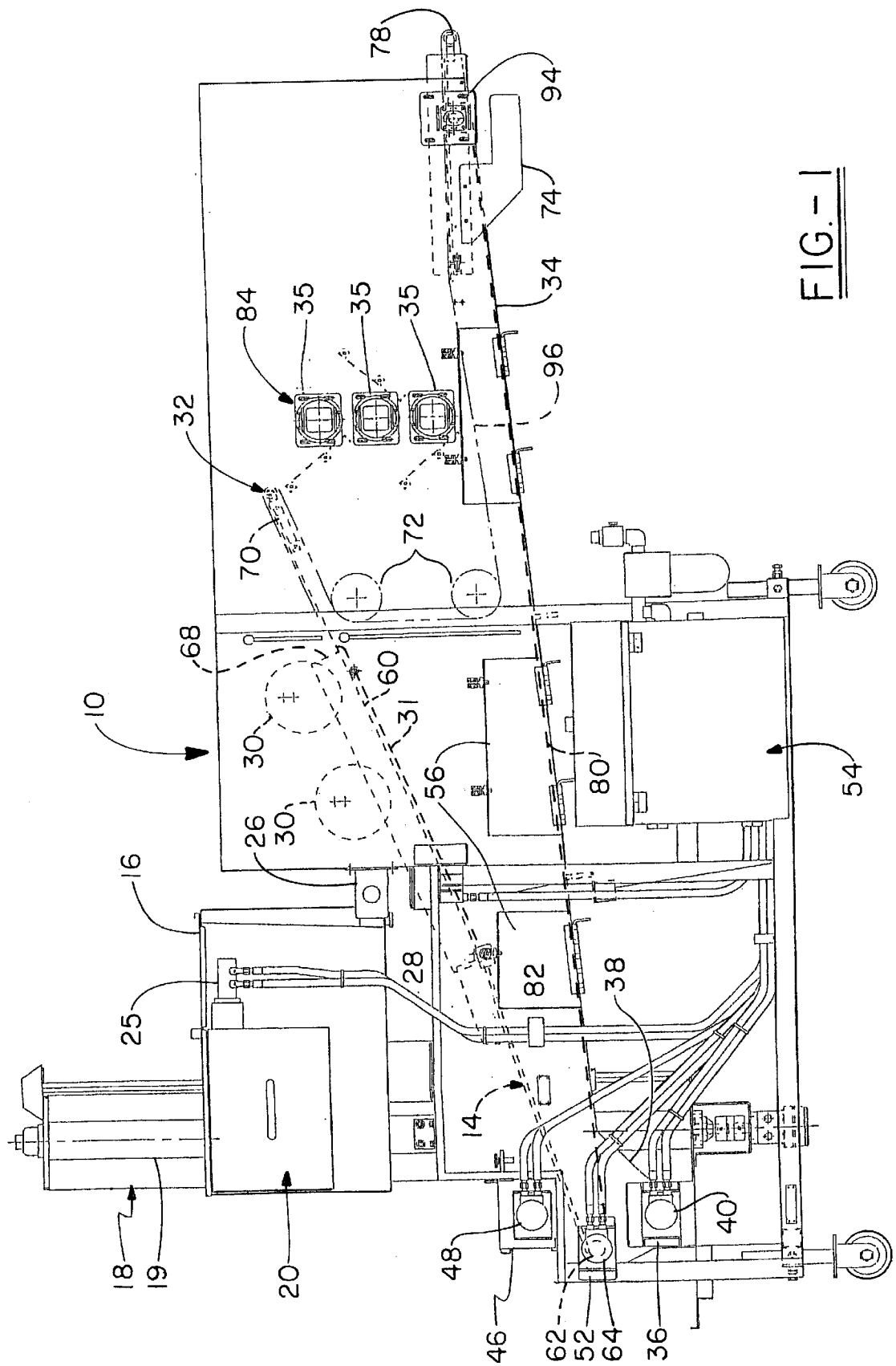
FIG. 1 is a side elevation of the coating machine of the present invention.
Figure 2:
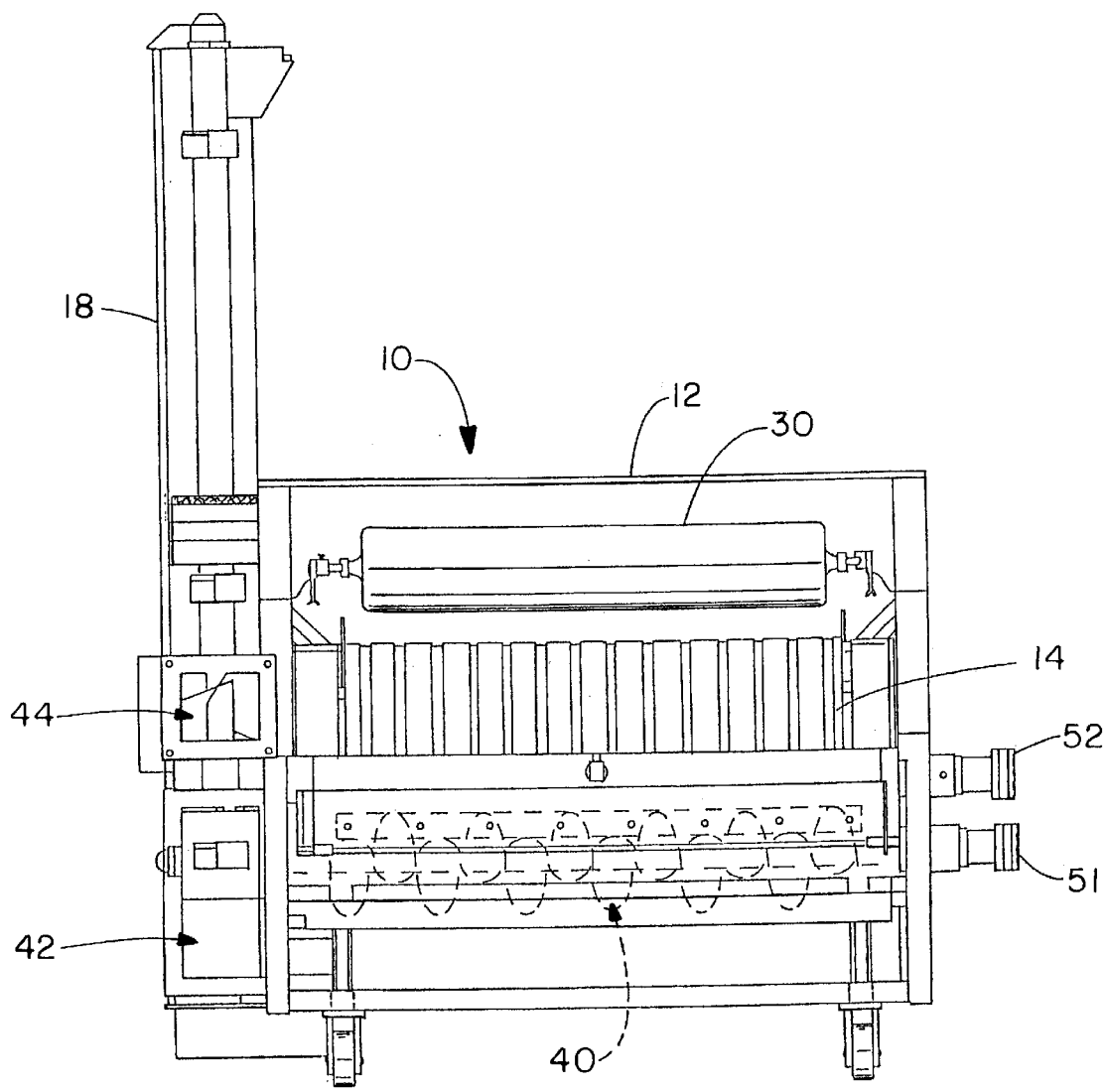
FIG. 2 is an elevation view of the infeed end of the coating machine of FIG. 1.

Turning now to FIGS. 1–2, the coating machine of the invention will be described in more detail. The coating machine 10 comprises an elongated frame enclosure 12 which supports a main product conveyor belt 14. The conveyor belt 14 is provided with a layer of coating or breading material thereon as will be hereinafter described, such that a bottom surface of food products placed on belt 14 will be coated therewith. An in-feed conveyor (not shown) or batter machine will convey either battered or unbattered food product into machine 10, to be placed on product belt 14 having the bottom layer of breading material placed thereon. The coating machine 10 also includes a hopper 16, which has been removed from FIG. 2 for clarity. The hopper 16 is adapted to be supplied with an amount of a coating or breading material by means of a vertical screw assembly 18 which will discharge breading material from its top end by means of a chute (not shown) for distribution to hopper 16. The hopper 16 may include a crumb box and sifter assembly 20 having a driver (not shown) conveyor belt to evenly distribute breading material in the hopper 16. The hopper 16 may also includes a conveying system (not shown) to convey breading material introduced into hopper 16 towards a discharge or hopper gate area 26. The hopper gate area 26 is an adjustable opening which will allow a desired amount of breading material to be withdrawn from hopper 16. For a flour coating material, the amount of flour from hopper 16 is disposed on a sprinkle conveyor 28 having a motor for driving thereof. This sprinkle conveyor 28 acts to distribute the flour breading material evenly and uniformly onto product conveyor belt 14 as a cloud of flour which will coat the top and side surfaces of the food products disposed on product conveyor belt 14. For other types of coating materials, the sprinkle belt 28 may not be needed, and breading will fall through the hopper gate area 26 as a curtain.

In the preferred embodiment, the product conveyor belt 14 is a pervious endless belt which forms an upper belt run 60 traveling on an upper pan 31 which supports upper belt run 60 over a significant portion of its length. The upwardly angled pan 31 allows the conveyor belt 14 to carry the bottom layer of breading material along with it as it travels along pan 31, such that food products placed on conveyor belt 14 will be set in the bottom layer of breading material over a substantial portion of the upper conveyor belt run 60 and for a significant dwell time. Additionally, any excess breading material will be carried along with conveyor belt 14 along the upper pan 31 for redistribution into the breading cycle of the apparatus. The upper pan 31 and upper belt run 60 of the product conveyor belt 14 have significant lengths, such that after food products introduced into the machine 10 have been coated on their bottom and top surfaces, a significant dwell time is achieved to allow breading material to set up on the food product and to achieve significantly improved coating characteristics. Additionally, the product belt 14 will carry an amount of excess coating material along therewith to achieve distinct advantages as will be hereinafter described.

The coated food product will be conveyed on product conveyor 14 to a plurality of pressure rolls 30, which will apply a slight pressure to food products to facilitate retention of the coating material thereon. After passing through the pressure rolls 30, the coated food products are further conveyed on main product belt 14 towards the discharge end 32 of upper belt run 60. At the discharge end 32, there is provided at least one and preferably a plurality of roller assemblies 84 which will be described in more detail hereinafter. The plurality of roller assemblies 84 are spaced relative to main product belt 14 to allow food products to be introduced to the roller assemblies 84 to increase the dwell time in which the food products will be exposed to coating material. Each of the roller assemblies 84 may be driven by means of motors 35. The endless main product belt 14 also has a bottom conveyor run which is returned along a bottom pan portion 34 of frame enclosure 12 so as to drag along the bottom sloping surface of pan 34. An amount of excess coating material will fall onto bottom pan portion 34 and the bottom conveyor run of the belt 14 will convey excess coating or breading material down the sloping surface of pan 34. In this way, excess coating material is directed towards a cross feed screw housing 36 in which the excess breading material will drop into from bottom pan 34 along sloping surface 38. The cross-feed housing 36 contains a cross-feed screw 40 which acts to convey breading material from cross feed housing 36 to a transition zone 42 which in turn will distribute breading material to the vertical screw housing 18.

The vertical screw 19 will convey the breading material upwardly wherein a portion thereof will be circulated into hopper 16 for continuation of the breading cycle within the coating machine 10. To create the bottom layer of coating material, the vertical screw housing 18 has an opening 44 therein through which an amount of breading material is discharged into a spreader screw housing 46. The spreader screw housing supports a spreader screw 48 therein which is adapted to convey the breading material horizontally within housing 46. The spreader screw housing includes an adjustable aperture formed along the bottom thereof such that as breading material is conveyed within spreader screw housing 46, an amount of breading material will fall therefrom to form a layer of the breading material across the width of the main product conveyor belt 14. This layer of breading material forms the bottom coating layer for food products to be positioned on product conveyor belt 14 as desired. Any excess breading material remaining within the spreader screw housing 46 is discharged therefrom through a relief hole in the cross feed screw housing 36 so as to be recirculated in the breading machine 10.

Some of the particular aspects of the coating material circulation system in coating machine 10 are substantially similar to that described in U.S. Pat. No. 5,056,455 issued Oct. 15, 1991 and assigned to the assignee of the present invention. Details of the structure of the circulation system including vertical screw 19, cross-feed screw 40, and spreader screw 48 may be referred to in the above-identified patent which is hereby incorporated by reference. For example, vertical screw 19 may be provided with double flighted auger blades at the location of discharge chute or transition zone 42 from the cross-feed screw housing 36 to more efficiently and more quickly move coating material from this area to avoid packing and congestion thereof Although the vertical screw 19 and housing 18 perform a similar function to convey coating material to form the bottom and top layers of coating material, the vertical screw housing 18 may be modified slightly to achieve improved results, as set forth in U.S. Pat. No. 5,238,493, which is also incorporated by reference herein. Particularly, at a bottom portion of the vertical screw housing 18 at the location of the infeed transition zone 42 may be modified to eliminate any ledge or channel formed in a side wall thereof at the location of the infeed transition zone to reduce breakdown or degradation of the coating or breading material within machine 10. This is especially apparent when using a breading material such as Japanese-style crumb material. It is also noted that the spreader screw 40 may be provided with double flighted auger blades at the location of opening 44 at the discharge chute thereof so as to more quickly move the coating material in this area and obtain uniform spreading onto the product conveyor belt 14. The cross-feed screw 40 may be driven by a separate motor 51 or may be coupled to the main drive shaft of the product conveyor belt which is driven by a motor 52.

After an amount of breading material is supplied to spreader screw housing 46 and the spreader screw 48, the remaining amount of breading material is conveyed upwardly by the vertical screw 19 within vertical screw housing 18 to be disposed into a discharge chute. From the vertical screw housing 18, the breading material may be conveyed back into hopper 16 by means of a sifter assembly which includes a sifter belt driven by a motor and may include a vibration means as well as a sifter crumb box to provide uniform distribution of the recirculated breading material into hopper 16. The breading material is then conveyed to the sprinkle belt 28 to form the top layer of breading material as previously described. Again, the details of the hopper 16 and associated structure may be referred to in U.S. Pat. No. 5,056,455 which has been incorporated herein by reference.

It is also noted that the breading machine 10 includes a control box 54 to control the speed of operation of the various hydraulic motors associated with breading machine 10 so as to control the speed at which product conveyor belt 14 moves, the speed of the cross feed screw 40, or a spreader screw 48, as well as the conveying systems associated with hopper assembly 16. Although hydraulic motors are preferred for variable speed control and maintenance purposes, other types of motors such as electrical may be utilized. Additionally, a variety of access doors 56 are provided on breading machine 10 to allow these to effectively clean and maintain coating machine 10 in good operating condition.

A unique aspect of the coating machine 10 of the present invention is found in the handling of coated food products at or near the discharge end 32 of machine 10. It has been found that problems in properly coating food products introduced into the coating machine 10 may be due to the inadequate dwell time of a coated food product within the coating apparatus before it is discharged to the next step of production in the food preparation process. In this way, a battered and coated food product will many times not have a sufficient thickness of coating material thereon, and may have a tendency to lose an amount of coating applied thereto or be stripped of an amount of coating after coming out of a coating machine into the next stage of food preparation. Additionally, various undesirable surface characteristics may be created if a coating material is not given sufficient time to set up and dry on a battered food product, and desirable "homestyle" appearance and texture is simply not achieved by placing food products on a layer of coating material on belt 14 or by sprinkling coating material on to the tops and sides thereof from hopper 16. These undesirable characteristics include conveyor belt marks formed on the coated food product, leaching of batter material through the coating so as to form what appears as uncoated portions on a food product or the like. It is therefore a main aspect of the coating machine 10 of the present invention to overcome these deficiencies and to provide various desirable coating characteristics by use of the machine 10. The desirable coating characteristics to be achieved by use of machine 10 include maximizing percentage pick up of coating material on the food products or providing a thicker coating on food products introduced into the apparatus 10, with the coating firmly set up on the food product to avoid the possibility that the coating material will dislodge from the product within the apparatus 10 or subsequent to the coating operation. Additionally, the coating machine 10 enables efficient and uniform coating of all food products introduced therein, with the resulting coating having a desired texture, such as "homestyle" appearance.

These desirable coating characteristics are achieved by providing a significantly longer dwell time within coating machine 10, pressing or forcing coating material into bonding relationship with the food product and providing surface treatment of a desired character by means of the roller assemblies 84. Particularly, the machine 10 has a significantly lengthened upper conveyor belt run on which food products travel after being coated on their upper and lower surfaces with the coating material, and subsequently the coated food products are introduced into the at least one roller assembly 84 onto which is sprinkled excess coating material during the coating cycle to achieve yet Go additional dwell time.

Figure 3:
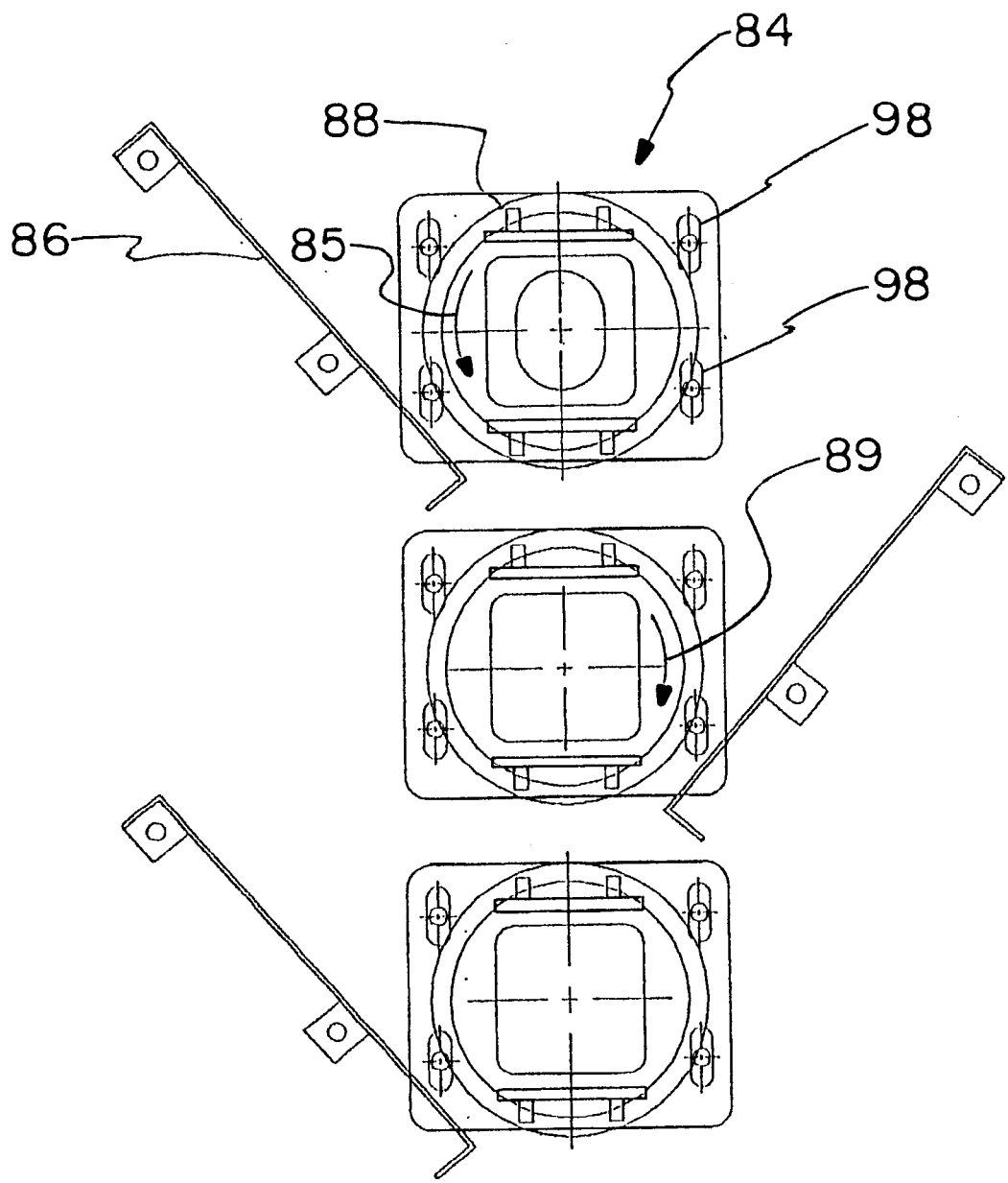
FIG. 3 is an enlarged top plan view of the coating chamber construction of the preferred embodiment.
Figure 4:
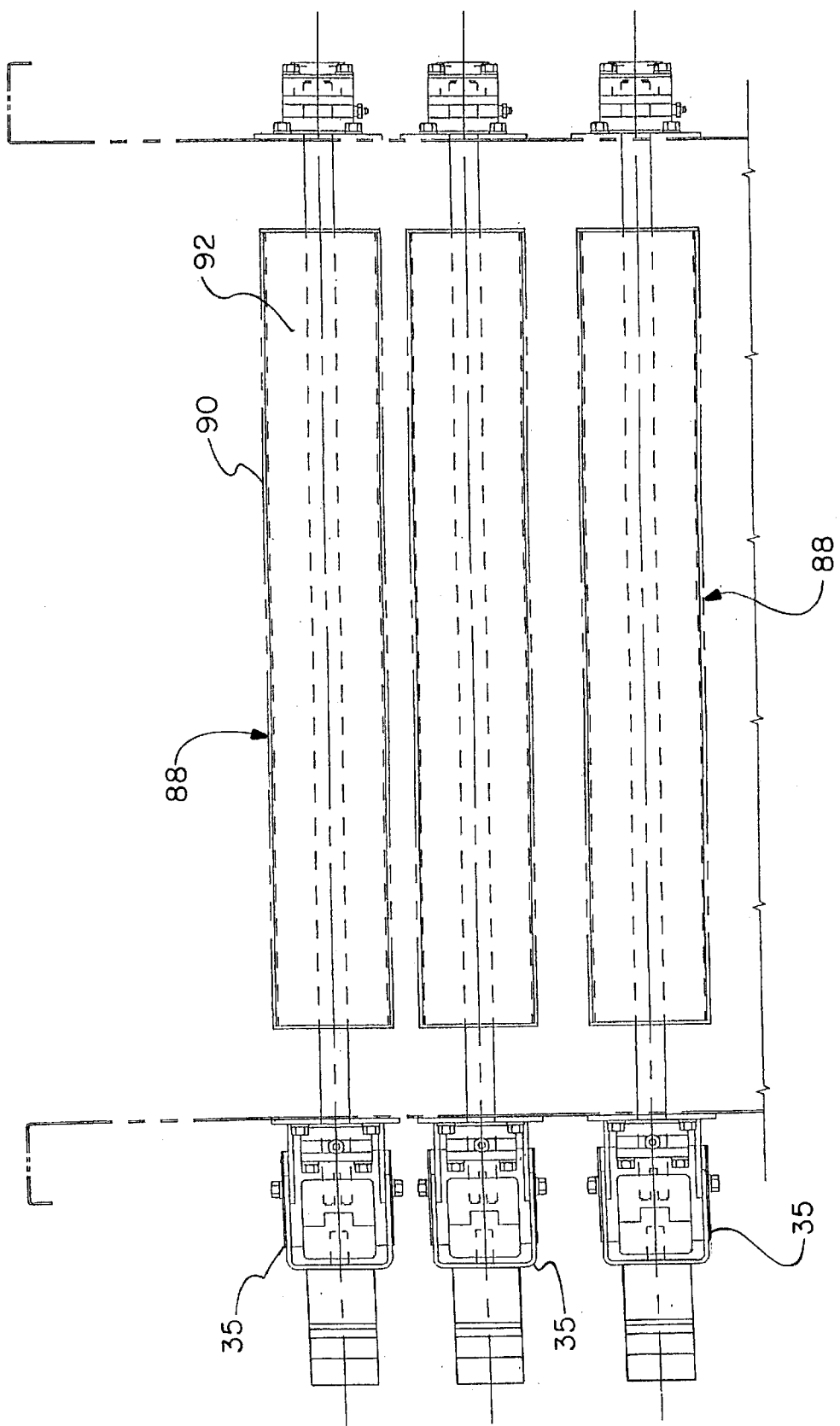
FIG. 4 is a generally schematic partial side elevation of the coating chamber construction of the preferred embodiment.

Turning now to FIGS. 3 and 4, the more particular aspects of the at least one roller assembly 84 are shown. In FIG. 1, the main conveyor belt 14 is shown to have an upper belt run 60 which is shown to extend from an infeed end 62 or the coating machine 10 and is driven by a drive sprocket 64 being coupled to a hydraulic motor 52 as previously described. Food products are introduced into coating machine 10 at a position adjacent infeed end 62 onto upper belt run 60 after a bottom layer of coating material has been formed on the upper belt run 60 by means of the spreader screw 48 within spreader screw housing 46 as previously described. The upper belt run 60 travels on an upper pan 31 which extends the length of the upper belt run 60 to a position shown at 68. The main conveyor belt 14 travels from belt support 70 to a pair of reversing rollers 72, and subsequently to a lower belt support member 74 lying adjacent the bottom pan portion 34 of frame enclosure 12. The portion of conveyor belt 14 traveling on belt support member 74 comprises the discharge end 78 of the coating machine 10, from which coated food product will exit to the next step in the food processing cycle, such as a fryer, cooking oven, freezing step, subsequent battering step or the like. After traveling around belt support member 74, the conveyor belt 14 forms a bottom conveyor belt run 80 which is adapted to travel along the downwardly inclined bottom pan portion 34 of the frame enclosure 12. Any excess coating material is adapted to be conveyed along bottom pan portion 34 by means of bottom conveyor run 80 to the downwardly inclined portion 38 of bottom pan 34 at the location of crossfeed screw 40 so as to be redistributed into a coating cycle within machine 10.

As seen in FIG. 1, the portion of upper conveyor belt run 60 adjacent infeed end 62 is inclined upwardly at a relatively steep angle until it reaches a transition shaft 82. Food products to be coated are introduced along this region of upper belt run 60 and onto a bottom layer of coating material to be coated therewith. Just past transition shaft 82, upper belt run 60 is inclined at a slightly steeper angle where food products will be coated on their top and side surfaces by means of the hopper 16 which will distribute coating material as a falling curtain or cloud over the entire width of belt 14 as previously described. The bottom and top layers of coating material formed on food products introduced into coating machine 10 are thereafter able to set up on food product along the portion of upper belt run 60 extending from transition shaft 82 to a termination point 68. As this entire region of upper belt run 60 is supported on upper pan portion 31, substantially no coating material is lost as food product continues to travel along this portion of its path.

The coating material then falls from upper run 60 into at least one or preferably a series of roller assemblies 84 to maximize percentage of coating pick up and to form the desirable surface and appearance characteristics as desired. Each roller assembly 84 in the preferred embodiment may include a roller plate or pan 86, which for the first assembly 84 is positioned directly beneath the end of the belt run 60 such that excess coating material falling from upper belt run 60 will fall thereon forming a continuous bottom layer of coating material. Food product conveyed along upper belt run 60 will be made to fall off conveyor belt 14 at the distal edge run 60 and be dropped onto plate 86. The roller assembly 84 further includes a roller 88 mounted at a predetermined position relative to plate 86. In the preferred embodiment, the roller 88 includes an outer layer 90, which may be formed on the surface of roller 88 or may be provided as a separate member wrapped around and retained on a base roller. In one embodiment, the outer layer 90 is formed from a separate mesh belt selectively fixed on a base roller as an example. Further, the invention contemplates the use of other materials to form the outer surface 90 to achieve a desired surface texture and appearance. In the preferred embodiment, the first roller assembly 84 and particularly roller 88 is driven by means of the motor 35, in the direction of arrow 85. The roller 88 is positioned adjacent the plate 86 in spaced apart relationship, and preferably a distance which will correspond to the dimensions of food products introduced into the machine 10. The space between roller 88 and plate 86 is preferably dimensioned so that food products dropped onto angled plate 86 will slide down and into this space so as to be pressed between the roller 88 and plate 86. In this way, coating material is pressed into the product on both sides to facilitate retention thereof. Further, the preferred embodiment allows for roller 88 to be driven so as to engage outer surface 90 with the food product and create a desired texture and surface appearance. In one aspect, the roller assembly 84 may drive roller 88 at a predetermined speed which in conjunction with outer surface 90 will cause slight scuffing or abrading of the coating material to yield a "homestyle" appearance similar to that which is achieved in batch drum breading operations. To further facilitate this ability, a series of roller assemblies 84 may be employed, which in the preferred embodiment may be disposed vertically with respect to one another. In the preferred embodiment, three roller assemblies 84 may be used in cooperation with one another. Employing a series of roller assemblies 84 enhances operation as the assemblies 84 work together to ensure maximizing percentage pick up and gives flexibility in the types of surface treatments that can be achieved. In operation, the roller assemblies 84 are disposed adjacent one another such that as a food product leaves the point of contact between plate 86 and roller 88 of a first assembly 84, the product is introduced into the space between rollers 88 in adjacent assemblies 84. This forms another point of contact on both surfaces of the product between rollers 88 and transfers the products to the plate 86 of the second roller assembly 84. As should be recognized in the preferred embodiment, the product is then urged by gravity down plate 86 into the space between the plate 86 and roller 88 of the second assembly 84 in a manner similar to that previously described. The roller 88 of the second assembly 84 may be driven in the opposed direction to that of the first assembly 84 or as shown by arrow 89 as desired by a separate motor 35. Subsequent assemblies 84 may also be employed, with a third assembly 84 shown in the preferred embodiment which will function similarly to the first assembly 84 in cooperation with the adjacent assembly 84. In the preferred embodiment, the series of roller assemblies 84 provide five points of contact through which the products are processed, each point of contact providing the pressing of coating into the product and creating desired surface and texture characteristics.

Once the food product is processed through the at least one assembly 84, it is dropped onto a lower run 96 of conveyor positioned below the bottom assembly, which can also be formed by conveyor 14. A series of reversing rollers 90 may be used to transition belt 14 to form the lower run 96. Once positioned on run 96, the product is then discharged from machine 10 at discharge end 78. A vibrator assembly 94 may be used to recover any dislodged coating before discharge. As also shown in FIG. 3, the roller assemblies 84 may be provided with adjustability to handle different types of food, coating materials or other variables. Each of the roller plates 86 may be adjustable both in angular orientation and/or in longitudinal positioning relative to roller 88, so as to adjust the angle of descent of the plate 86 as well as the spacing to roller 88. The rollers 88 may also be adjustable in vertical and/or horizontal directions relative to one another or the associated plates 86. In FIG. 3, slots 92 are provided which mount the roller at a predetermined position and allow adjustment therein. It should be recognized that the adjustment of the plates 86 and/or rollers 88 will allow a wide variety of products to be easily handled in machine 10. It is also desirable to provide for adjustment between roller assemblies 84 to achieve different and desirable surface and texture characteristics. The rollers 88 are therefore preferably independently driven by separate motors 35, which allows the speed of rotation of each to be separately controlled. To create desired surface characteristics, the rotational speeds of cooperating roller assemblies 84 may be different, and in the preferred embodiment may be rotated at speeds between 20–100 rpm. Of course, the invention is not to be limited to this embodiment, and the rollers could be driven by a common motor or not driven at all if desired. The ability to handle a wide variety of products is also achieved by an adaptable configuration of rollers 88 in the preferred embodiment. As previously mentioned, the rollers 88 may have an integral or separate outer surface 90 to engage product and crate the desired surface and texture characteristics. A separate surface forming member provided on a base roller will give an operator flexibility in the types of treatments which can be achieved, and the outer surface could be selectively changed to accommodate different products and/or treatments. Additionally, the rollers 88 themselves could be made of different material to facilitate operation. For example, the roller 88 could be constructed as a hollow stainless steel roller, having a smooth or textured surface, which may for example be used in processing boneless chicken. Alternatively, the roller 88 could be formed as a pneumatic or inflatable roller if desired, which may be used for processing bone-in chicken as an example. A wide variety of configurations are therefore possible and are contemplated in the invention. Similarly, a stainless steel mesh belt may form the outer surface 90 or another type or configuration of material may be used as desired. Again, a wide variety of configurations are therefore possible and are contemplated in the invention.

The invention therefore provides increased dwell distance and time without compromising production capabilities of the coating machine 10, and provides the distinct advantages as described. The coating process as achieved in the coating machine 10, allows a heavier and thicker coating of breading or other material to be formed on the food products while allowing the coating material to set up on the food products so as to minimize any chance that the coating material will dislodge from the coated food products during coating or subsequent to the coating operation. The desirable "homestyle" or other surface characteristics and textures are also obtained in a flexible arrangement. The coating machine 10 has been found to be extremely advantageous for the use of flour type breading materials, but is also suitable for use with free flowing breading as well as possibly Japanese-style crumbs and other coating materials.

Although the invention has been described with reference to a particular preferred embodiment thereof, it should be recognized that various changes and modifications may be made without departing from the spirit and scope of the invention as defined in the appended claims.

What is claimed is:

1. A coating machine for selectively disbursing a coating material onto a product passing therethrough, comprising, a frame defining a main product conveyor path having main conveyor for conveying product positioned thereon along said main conveyor path, said main conveyor path having a product input end and a product discharge end, a coating dispensing system for dispensing a coating material onto at least said main conveyor path such that coating material is disbursed onto said products positioned on said main conveyor path;

at least one roller assembly positioned in spaced apart relationship adjacent said discharge end of said main conveyor path, said at least one roller assembly comprises a roller plate and a roller positioned adjacent one another and defining a space therebetween wherein product discharged from said main conveyor falls onto said roller plate and is directed to said space and is pressed between said plate and said roller;

a discharge conveyor path positioned adjacent said at least one roller assembly to accept products after passing through said space for discharge from said coating machine at said product discharge end.

2. The coating machine of claim 1, wherein, said main product conveyor path is inclined within said frame such that the length of said main path is increased.

3. The coating machine of claim 1, wherein, said main conveyor means is a pervious conveyor belt which is supported on an impervious pan over a portion of its length such that coating material dispensed thereon will form a bottom layer of coating material and said conveyor will carry said coating material along therewith as it travels in said frame.

4. The coating machine of claim 1, further comprising, a series of said roller assemblies positioned in relationship with one another so as to cooperate with one another whereby product discharged from a said roller assembly is introduced to another of said roller assemblies and said space formed between said roller and said plate.

5. The coating machine of claim 4, wherein, said series of roller assemblies are positioned with respect to one another such that the rollers of cooperating roller assemblies are positioned adjacent one another and in spaced apart relationship to define a space therebetween, wherein product introduced to a roller assembly from a cooperating assembly transfers product to said space defined between said rollers where said product is pressed between said adjacent rollers.

6. The coating machine of claim 1, wherein, the position of said roller of said at least one roller assembly is adjustable relative to said plate.

7. The coating machine of claim 4 wherein, the position of said roller of said at least one roller assembly is adjustable relative to said roller of a cooperating assembly.

8. The coating machine of claim 1, wherein, the position of said plate of said at least one roller assembly is adjustable relative to said roller.

9. The coating machine of claim 8, wherein, the orientation of said plate is adjustable relative to said roller.

10. The coating machine of claim 1, wherein, said roller includes an outer surface having a predetermined configuration for creating surface characteristics on product passing through said space.

11. The coating machine of claim 10, wherein, said outer surface is a separate member selectively positioned on said roller to form said outer surface.

12. The coating machine of claim 11, wherein,
said separate member is a belt dimensioned to coincide with said roller which is positioned around said roller to form said outer surface.

13. The coating machine of claim 12, wherein,
said belt is a wire mesh belt having predetermined mesh size to form desired surface characteristics on said product.

14. The coating machine of claim 10, wherein,
said outer surface is integral and formed with said roller.

15. The coating machine of claim 1, wherein,
said roller of said at least one roller assembly is rotatably driven relative to said plate at a predetermined rotational speed.

16. The coating machine of claim 15, further comprising,
a series of said roller assemblies positioned in relationship with one another so as to cooperate with one another, and wherein said rollers of said series of roller assemblies are independently rotatably driven at predetermined rotational speeds.

17. The coating machine of claim 16, wherein,
said rollers of said series of said roller assemblies are rotatably driven at different rotational speeds,
said roller of said at least one roller assembly is rotatably driven relative to said plate at a predetermined rotational speed.

18. A coating machine for coating a product, comprising a frame defining a product conveyance path, a conveyor for conveying products on said product conveyance path, a coating dispensing system for dispensing a coating material on said products, and at least one roller assembly positioned relative to said products to impart a pressing force thereon, said roller assembly comprising at least one roller and a roller plate defining a space therebetween, said at least one roller having a separate outer member to form an outer surface, wherein said separate outer member is a wire mesh belt having predetermined mesh size to form desired characteristics on said product.

19. A coating machine for coating a product, comprising a frame defining a product conveyance path, a conveyor for conveying products on said product conveyance path, a coating dispensing system for dispensing a coating material on said products, and at least two roller assemblies positioned relative to said products to impart a pressing force thereon, each of said at least two roller assemblies comprising at least one roller and a roller plate defining a space therebetween, wherein the at least one roller of one of said at least two roller assemblies is adjustable relative to at least one roller of the other of said assemblies.

20. The coating machine of claim 19, wherein said roller assembly is positioned in spaced apart relation to said product conveyance path such that product on said conveyance path is discharged to one of said least two roller assemblies and falls onto said roller plate thereof and is directed to said space.

* * * * *